US012726516B1

(12) United States Patent
Moriarty et al.

(10) Patent No.: US 12,726,516 B1
(45) Date of Patent: Sep. 1, 2026

(54) SYSTEM AND METHOD FOR TYPOSQUAT DETECTION AND ALERTING

(71) Applicant: Morgan Stanley Services Group Inc., New York, NY (US)

(72) Inventors: Russell A. Moriarty, Ellicott City, MD (US); Joseph T. Edmonds, Ellicott City, MD (US); Eric A. Mudge, Ellicott City, MD (US); Patrick J. St. John, Catonsville, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/560,749

(22) Filed: Mar. 9, 2026

(51) Int. Cl.
*H04L 9/40* (2022.01)
*G06Q 10/107* (2023.01)

(52) U.S. Cl.
CPC ....... *H04L 63/1483* (2013.01); *G06Q 10/107* (2013.01)

(58) Field of Classification Search
CPC .......................... H04L 63/1483; G06Q 10/107
See application file for complete search history.

(56) References Cited

U.S. PATENT DOCUMENTS

| | | | | |
|---|---|---|---|---|
| 7,475,118 | B2 * | 1/2009 | Leiba | G06Q 10/107 709/224 |
| 8,285,830 | B1 * | 10/2012 | Stout | H04L 63/1441 709/224 |
| 8,549,081 | B2 * | 10/2013 | Leiba | G06Q 10/107 709/206 |
| 8,914,883 | B2 * | 12/2014 | Windsor | H04L 63/101 726/4 |
| 9,130,989 | B2 * | 9/2015 | Windsor | H04L 51/212 |
| 9,413,716 | B2 * | 8/2016 | Windsor | H04L 63/1408 |
| 9,521,114 | B2 * | 12/2016 | Windsor | H04L 63/101 |
| 10,326,735 | B2 * | 6/2019 | Jakobsson | H04L 63/0254 |
| 10,419,477 | B2 * | 9/2019 | Desai | H04L 63/1483 |
| 10,785,260 | B2 | 9/2020 | Schneiders | |
| 10,860,717 | B1 | 12/2020 | Edmonds | |

(Continued)

OTHER PUBLICATIONS

U.S. Appl. No. 19/560,820, filed Mar. 9, 2026, Metzger et al.
U.S. Appl. No. 19/560,914, filed Mar. 9, 2026, Moriarty et al.
U.S. Appl. No. 19/560,980, filed Mar. 9, 2026, Edmonds et al.

*Primary Examiner* — Sharon S Lynch
(74) *Attorney, Agent, or Firm* — HUNTON ANDREWS KURTH LLP

(57) ABSTRACT

An embodiment of the present invention is directed to a typosquat detection system configured to: receive SMTP telemetry data from enterprise email communications; extract domain names and email addresses from the SMTP telemetry data; access a domain observation cache that stores previously observed domains and email addresses with corresponding observation context information to determine one or more newly observed domains and email addresses; route the one or more newly observed domains to a domain typosquat detector subsystem that applies a first set of filters and a first string similarity algorithm to determine whether to generate a domain typosquat alert; route the one or more newly observed email addresses to a webmail typosquat detector subsystem that applies a second set of filters and a second string similarity algorithm to determine whether to generate a webmail typosquat alert; and transmit alerts for analyst review and triage.

20 Claims, 5 Drawing Sheets

(56) References Cited

U.S. PATENT DOCUMENTS 10,990,676 B1 4/2021 Edmonds et al.
11,681,805 B1 6/2023 Oakley et al.
12,190,161 B1 1/2025 Kerr et al.
12,271,757 B1 4/2025 Kerr et al.
12,271,811 B2 * 4/2025 Chang .................... G06N 3/09
12,301,622 B1 * 5/2025 Edmonds ............ H04L 63/1483
12,542,800 B2 * 2/2026 McClurg ............. H04L 63/1425
2007/0016645 A1 * 1/2007 Na ....................... G06Q 10/107 709/206
2007/0185960 A1 * 8/2007 Leiba ................... G06Q 10/107 709/206
2007/0299915 A1 * 12/2007 Shraim ............... H04L 63/1491 709/229
2008/0034211 A1 * 2/2008 Shull ................... H04L 61/4511 713/175
2009/0094342 A1 * 4/2009 Leiba ................... G06Q 10/107 709/206
2009/0182818 A1 * 7/2009 Krywaniuk ........... H04L 51/212 709/206
2010/0095377 A1 * 4/2010 Krywaniuk ........... H04L 51/212 709/206
2014/0331318 A1 * 11/2014 Windsor ............... H04L 51/212 726/22
2015/0089627 A1 * 3/2015 Windsor ............. H04L 63/1483 726/12
2015/0312214 A1 * 10/2015 Windsor ................. H04L 63/02 726/12
2016/0255049 A1 * 9/2016 Windsor ............. H04L 63/1441 726/12
2016/0352772 A1 12/2016 O'Connor
2017/0078321 A1 3/2017 Maylor et al.
2018/0063174 A1 * 3/2018 Grill ................... H04L 63/0236
2018/0091476 A1 * 3/2018 Jakobsson ........... H04L 63/1433
2018/0091478 A1 * 3/2018 Jakobsson ........... H04L 63/0254
2018/0139235 A1 * 5/2018 Desai .................. H04L 63/1483
2021/0374526 A1 * 12/2021 Chang ...................... G06N 3/08
2021/0377303 A1 * 12/2021 Bui ....................... G06F 18/253
2024/0106857 A1 3/2024 Fennell et al.
2024/0220630 A1 7/2024 Prizmant et al.
2025/0039218 A1 * 1/2025 McClurg ............. H04L 63/1425
2025/0200368 A1 * 6/2025 Chang ...................... G06N 3/08
2025/0280036 A1 9/2025 Tatti et al.

* cited by examiner

SYSTEM AND METHOD FOR TYPOSQUAT DETECTION AND ALERTING

FIELD OF THE INVENTION

The present invention relates generally to cybersecurity systems for detecting malicious email communications, and more specifically to a typosquat detection and alerting system and method that identifies domains and email addresses impersonating legitimate enterprise contacts through similarity analysis and contextual filtering to prevent business email compromise attacks.

BACKGROUND

Business email compromise (BEC) attacks represent a growing threat to enterprise cybersecurity, with attackers using sophisticated social engineering techniques to impersonate trusted contacts and manipulate employees into transferring funds or disclosing sensitive information. These attacks, commonly referred to as typosquat, typically involve the creation of fraudulent email addresses or domain names that closely resemble legitimate ones, exploiting the human tendency to overlook minor typographical variations when interacting through email communications.

Traditional email security systems primarily focus on detecting malware, spam, and known malicious indicators, but often fail to identify newly created domains and email addresses specifically crafted to target individual enterprises.

Modern enterprise email environments process enormous volumes of email traffic daily, with thousands of new domains and email addresses appearing in email communications. Manually reviewing each new domain or email address for potential impersonation attempts would be impractical given the scale of email traffic in large organizations. The challenge is compounded by the fact that legitimate new domains and email addresses regularly appear in enterprise communications through normal business activities, making it difficult to distinguish between benign and malicious new contacts.

Accordingly, there is a need for an improved system and method for effective typosquat detection and alerting that overcomes the above challenges.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an embodiment of the present invention, a computer-implemented system provides typosquat detection and analysis. The system comprises: an interface configured to receive telemetry data from a plurality of sources; a database configured to store observation data; and a computer server comprising a computer processor coupled to the interface and the database, wherein the computer processor is further configured to perform the steps of: receiving, via an interface, SMTP telemetry data from enterprise email communications; extracting, via a computer processor, domain names and email addresses from the SMTP telemetry data; accessing, via a summarization module, a domain observation cache that stores previously observed domains and email addresses with corresponding observation context information to determine one or more newly observed domains and email addresses; routing, via the computer processor, the one or more newly observed domains to a domain typosquat detector subsystem that applies a first set of filters and a first string similarity algorithm to determine whether to generate a domain typosquat alert; routing, via the computer processor, the one or more newly observed email addresses to a webmail typosquat detector subsystem that applies a second set of filters and a second string similarity algorithm to determine whether to generate a webmail typosquat alert; and transmitting, via a communication link, the domain typosquat alert and the webmail typosquat alert to a security information and event management system for analyst review and triage.

According to another embodiment, a computer-implemented method for typosquat detection and analysis comprising the steps of: receiving, via an interface, SMTP telemetry data from enterprise email communications; extracting, via a computer processor, domain names and email addresses from the SMTP telemetry data; accessing, via a summarization module, a domain observation cache that stores previously observed domains and email addresses with corresponding observation context information to determine one or more newly observed domains and email addresses; routing, via the computer processor, the one or more newly observed domains to a domain typosquat detector subsystem that applies a first set of filters and a first string similarity algorithm to determine whether to generate a domain typosquat alert; routing, via the computer processor, the one or more newly observed email addresses to a webmail typosquat detector subsystem that applies a second set of filters and a second string similarity algorithm to determine whether to generate a webmail typosquat alert; and transmitting, via a communication link, the domain typosquat alert and the webmail typosquat alert to a security information and event management system for analyst review and triage.

The foregoing general description of the illustrative embodiments and the following detailed description thereof are merely exemplary aspects of the teachings of this disclosure and are not restrictive.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1A:
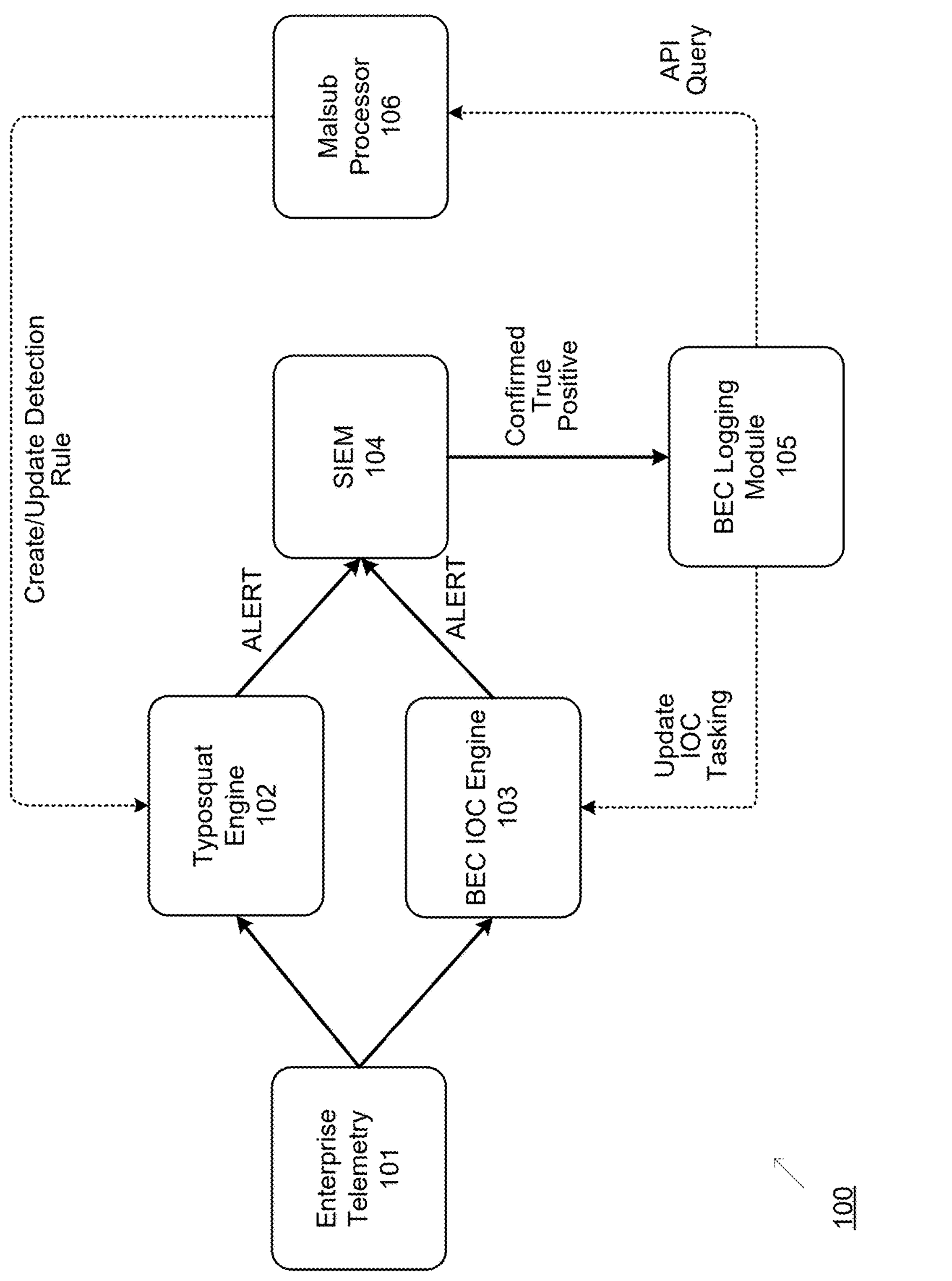
FIG. 1A is an exemplary system diagram, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to a typosquat detection system that identifies potentially malicious domains and email addresses used in business email compromise attacks by analyzing email telemetry data and comparing newly observed domains against previously established contacts. An embodiment of the present invention may receive SMTP telemetry data from enterprise email communications and extract domain names and email addresses from various fields including sender addresses, recipient addresses, and URLs contained within email messages. A domain observation cache may store previously observed domains and email addresses along with contextual information about how and where each domain or email address was observed within email communications. Newly observed domains and email addresses may be compared against previously observed domains and email addresses using similarity algorithms including Levenshtein distance, Damerau-Levenshtein distance, and Jaro-Winkler similarity scoring to identify potential typosquats that closely resemble legitimate enterprise contacts. Filtering logic may be used to reduce the set of previously observed domains or email addresses used for this comparison to those which have been observed recently (e.g., within the past 90 days) and those which are determined to be legitimate contacts (e.g., by eliminating domains and addresses that have only ever been blocked by email proxy).

An embodiment of the present invention may implement separate processing pathways for domain-based typosquat detection and webmail-based typosquat detection to account for the different characteristics of enterprise domains and webmail services. The domain typosquat detection may utilize external domain enrichment services to obtain registration dates and ownership information for newly observed domains. The webmail typosquat detection may utilize a graph database to track communication patterns and relationships between webmail addresses and enterprise contacts, enabling the system to apply relationship-based filtering criteria that may reduce false positive alerts while maintaining detection accuracy for legitimate typosquat threats. An embodiment of the present invention may apply multiple filtering criteria including advertising filters, bulk mail filters, legitimate contact verification, and communication pattern analysis to reduce false positive alerts while preserving detection capability for targeted business email compromise attempts.

In addition, an embodiment of the present invention may implement a keyword module that generates alerts for newly observed domains or email addresses containing specific high-risk keywords associated with professional categories commonly targeted in business email compromise attacks. Further, a limited contact monitor may provide additional scrutiny for enterprise email addresses that communicate with a restricted set of external contacts, enabling the system to detect unauthorized communication attempts that may indicate potential security concerns or business email compromise attempts targeting specialized business functions.

Alerts may be generated for potential typosquats that satisfy similarity thresholds and filtering criteria and then transmitted to a security information and event management (SIEM) system for analyst review and triage.

An embodiment of the present invention is directed to reducing alert volume at various typosquat processing and filtering components because SIEM systems generally do not perform filtering. According, an embodiment of the present invention is directed to balancing detection accuracy with alert volume management through multiple filtering criteria that reduce false positive alerts while preserving detection capability for genuine typosquat threats. The filtering criteria may ensure that alerts generated by the system represent actionable security concerns that warrant analyst attention rather than benign domain variations or legitimate business communications. The multi-layered filtering approach seeks to maintain high detection accuracy for targeted business email compromise attempts while reducing the volume of false positive alerts to levels that are manageable within enterprise security operations workflows.

FIG. 1A is an exemplary system diagram, according to an embodiment of the present invention. System 100 includes Enterprise Telemetry 101, a Typosquat Engine 102, a BEC IOC Engine 103, a SIEM 104, a BEC Logging Module 105, and Malicious Substitution (Malsub) Processor 106. Enterprise Telemetry 101 may serve as a data source that provides telemetry data to Typosquat Engine 102 and BEC IOC Engine 103. The telemetry data may include domain information, email addresses, and/or other network communications observed within an enterprise environment.

Typosquat Engine 102 receives telemetry data and analyzes incoming data to detect typosquat domains. Typosquat Engine 102 may use a string similarity metric to compare two strings and generate an alert if the similarity is above a certain threshold. For example, the string similarity metric may include a Jaro-Winkler similarity score or other distance-based comparison algorithms. When Typosquat Engine 102 determines that a domain or email address exhibits sufficient similarity to a known legitimate entity, Typosquat Engine 102 generates an alert that is transmitted to SIEM 104. Additional details concerning the Typosquat Engine may be found below.

BEC IOC Engine 103 may process telemetry data to identify indicators of compromise associated with business email compromise attacks. BEC IOC Engine 103 may generate alerts based on identified indicators of compromise and transmit the alerts to SIEM 104. SIEM 104 may receive and aggregate alerts from Typosquat Engine 102 and BEC IOC Engine 103 for analyst triage and investigation. Analysts may review the alerts within SIEM 104 to determine whether each alert represents a true positive or a false positive. Additional details concerning the BEC IOC Engine may be found in co-pending application U.S. Ser. No. 19/560,980, entitled "System and Method for Business Email Compromise Detection with Compromised Communicant Monitoring," filed Mar. 2, 2026, the contents of which are incorporated by reference herein in its entirety.

When alerts are determined to be confirmed true positives, SIEM 104 may forward the confirmed true positive information to BEC Logging Module 105. BEC Logging Module 105 may save Packet Capture (PCAP) data which may include the email message and any attachments associated with confirmed true positive cases. For example, BEC Logging Module 105 may store metadata identifying which domain or email address was being impersonated by a malicious entity. BEC Logging Module 105 may provide updated IOC tasking information back to BEC IOC Engine 103, enabling System 100 to incorporate newly identified indicators of compromise into future detection operations. BEC Logging Module 105 may store labeled pairs of legitimate and malicious domains and email addresses for developing new detection patterns. Additional details concerning the BEC Logging Module may be found in co-pending application U.S. Ser. No. 19/560,820, entitled "System and Method for Business Email Compromise Logging, Memorialization and Data Analysis," filed Mar. 2, 2026, the contents of which are incorporated by reference herein in its entirety.

Malsub Processor 106 may query BEC Logging Module 105 via an API to retrieve data from confirmed true positive cases. Malsub Processor 106 may perform analysis on the retrieved data to develop new detection rules. Malsub Processor 106 may detect cases where the similarity threshold would not be met but an alert should still be generated through independent pattern matching. This capability enables System 100 to identify typosquat patterns that string similarity scoring alone would miss, such as visual deception cases where characters like "rn" are swapped for "m" or where "I" is substituted for "1". Malsub Processor 106 may create and update detection rules that are fed back to Typosquat Engine 102, enabling detection of malicious patterns. Additional details concerning the Malsub Processor may be found in co-pending application U.S. Ser. No. 19/560,914, entitled "System and Method for Typosquat Pattern Tracking and Analytic Tuning,", filed Mar. 9, 2026, the contents of which are incorporated by reference herein in its entirety.

In addition, a SIEM API may be accessible by Malsub Processor 106 for querying additional data. For example, Malsub Processor 106 may query SIEM 104 directly through the SIEM API to retrieve supplementary information for analysis. The feedback loop between Malsub Processor 106 and Typosquat Engine 102 allows System 100 to continuously improve detection capabilities based on previously confirmed attacks.

Figure 1B:
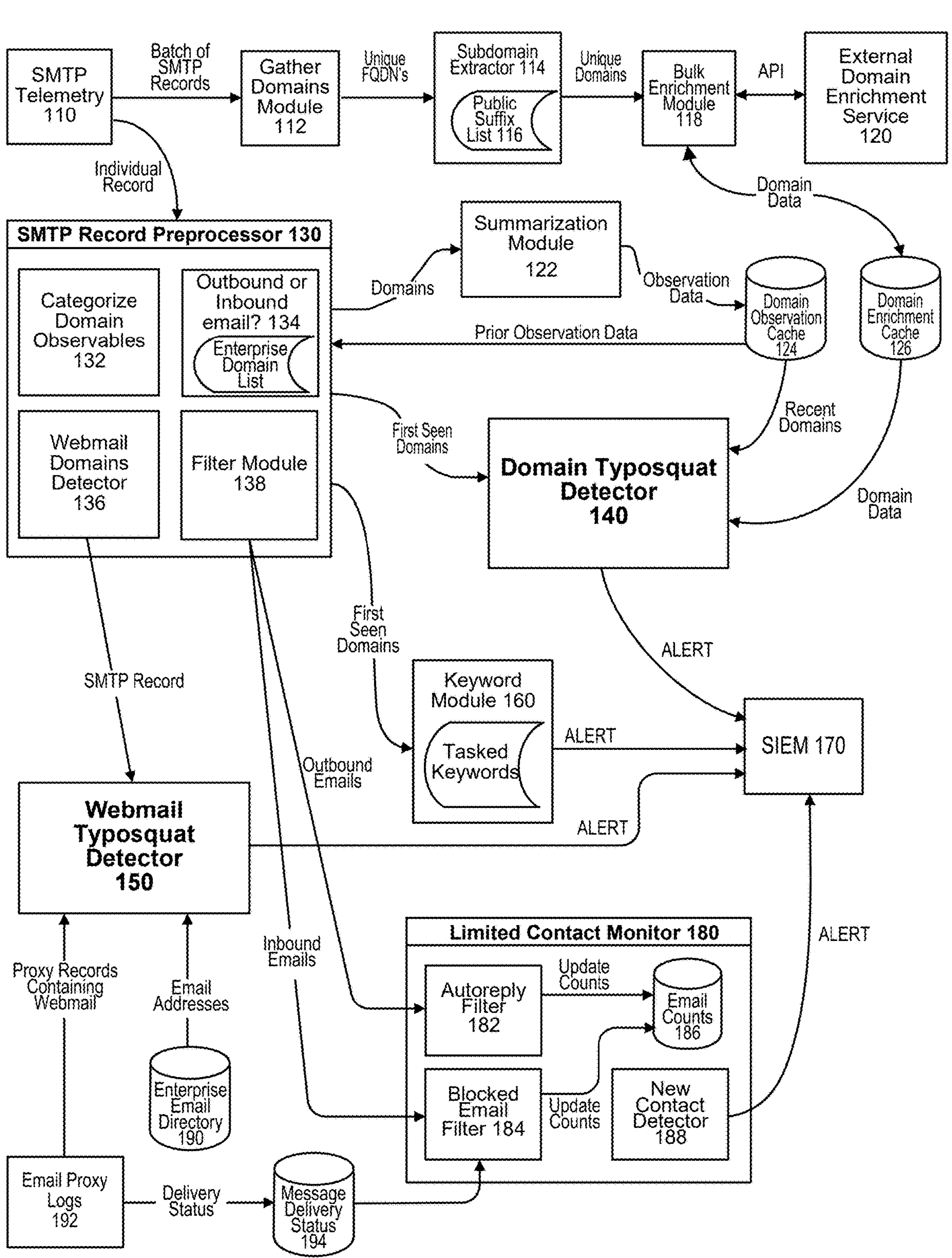
FIG. 1B is an exemplary system diagram of a typosquat detection system, according to an embodiment of the present invention.

FIG. 1B is an exemplary system diagram of a typosquat detection system, according to an embodiment of the present invention.

As shown in FIG. 1B, an embodiment of the present invention system may receive SMTP Telemetry 110 from enterprise email communications and process the telemetry data through multiple components to detect typosquats that closely resemble legitimate contacts of an enterprise. SMTP Telemetry 110 may contain email header information, message content, and metadata from email communications traversing the enterprise email infrastructure. The system may extract domain names and email addresses from the SMTP telemetry data through Gather Domains Module 112, which may parse email records to identify domain observations from various fields including sender addresses, recipient addresses, and URLs contained within email messages. Gather Domains Module 112 may generate unique Fully Qualified Domain Names (FQDNs) that represent a complete domain name for a specific computer, host, or service on the internet, including levels of the domain hierarchy.

Subdomain Extractor 114 may process domains to identify and extract relevant subdomain components for external enrichment queries. Subdomain Extractor 114 may utilize a Public Suffix List 116 to distinguish between actual top-level domains and subdomain structures. For example, Subdomain Extractor 114 may identify subdomains such as companyABC.oncompany123.com and extract relevant portions for external enrichment queries while treating the full subdomain as a unique observation for internal tracking purposes. By treating the subdomain as part of the observation, this may prevent unnecessary queries to external data sources.

Bulk Enrichment Module 118 may interface with an External Domain Enrichment Service 120 to obtain registration and ownership information for observed domains. Bulk Enrichment Module 118 may batch domain records together and submit the batched records in bulk to external threat intelligence providers. This provides query efficiencies and stays within any limits that may be imposed.

External Domain Enrichment Service 120 may provide registration dates and ownership information for domains queried by Bulk Enrichment Module 118. For example, external domain enrichment may be used to focus detections on recently registered domains. External Domain Enrichment Service 120 may supply threat intelligence data that enable the system to implement domain age-based filtering and other heuristics for reducing false positive alerts.

Domain Enrichment Cache 126 may store external domain data obtained from External Domain Enrichment Service 120. Domain Enrichment Cache 126 may maintain cached domain information for a configurable expiration period. Domain Enrichment Cache 126 may prevent redundant queries for previously enriched domains and enable efficient operation within rate limits while maintaining current domain registration information.

Summarization Module 122 may aggregate and categorize domain observations extracted from SMTP Telemetry 110. Summarization Module 122 may process observations to maintain contextual information about how, when and where each domain or email address was observed within email communications (e.g., first seen, last seen, number of times seen, etc.). Additional details concerning the summarization module may be found in U.S. Pat. No. 12,301,622, entitled "System for Cybersecurity Campaign Artifact Discovery and Tasking," which was filed Sep. 9, 2024, and issued May 13, 2025, the contents of which are incorporated by reference herein in its entirety. For example, Summarization Module 122 may categorize observations based on the context in which domains and email addresses appear within email communications. Summarization Module 122 may categorize observations according to SMTP header fields including to, from, cc, and reply-to fields where domains and email addresses may be extracted. Summarization Module 122 may also categorize observations based on URL locations within email body content where domains may appear as part of hyperlinks or embedded references. Additionally, Summarization Module 122 may categorize observations extracted from file attachments that may be transmitted with email messages.

Domain Observation Cache 124 may store previously observed domains and email addresses along with observation context information maintained by Summarization Module 122. Domain Observation Cache 124 may maintain a comprehensive record of domain and email address observations that enables the system to distinguish between newly observed and previously seen entities for typosquat detection purposes. Domain Observation Cache 124 may track temporal observation data for each stored domain and email address, e.g., when domains were first seen, last seen, and the number of times each domain has been observed. Domain Observation Cache 124 may split temporal tracking data by different observation contexts, enabling the system to maintain separate counts and timestamps for domains observed in header fields versus domains observed in email body content or file attachments.

In addition, Domain Observation Cache 124 may categorize observations based on context including header fields, email body content, and URL locations. The contextual categorization may enable Domain Typosquat Detector 140 and Webmail Typosquat Detector 150 to apply different detection logic based on how domains and email addresses were observed. For example, domains observed within SMTP header fields may be subject to different similarity thresholds or filtering criteria compared to domains extracted from URL locations within email body content.

For example, an embodiment of the present invention may generate multiple typosquat alerts for the same domain when the domain is observed in different contexts. A domain initially observed within email body content may generate a first typosquat alert, and the same domain later observed in an SMTP header field may generate a second typosquat alert based on the different observation context stored in Domain Observation Cache 124.

SMTP Record Preprocessor 130 may process email records to extract and categorize domain observations before routing the observations to appropriate detection pathways. SMTP Record Preprocessor 130 may receive processed email data from Summarization Module 122 and may perform initial filtering and categorization operations to prepare domain and email address observations for appropriate and efficient typosquat analysis. For example, SMTP Record Preprocessor 130 may gather domain observations and categorize them by how they were observed (e.g., URL within the body, reply to field, etc.) as well as whether this is a first seen domain.

SMTP Record Preprocessor 130 may include Categorize Domain Observables Module 132 that extracts and classifies domains based on their observation context within email communications, categorizing domain observations according to where they appear within email records, including SMTP header fields, email body content, and URL locations.

Webmail Domains Detector 136 may identify whether domains correspond to webmail services such as Gmail, Yahoo, or Outlook to enable appropriate routing to specialized detection pathways, with webmail domains routed to Webmail Typosquat Detector 150 and non-webmail domains routed to Domain Typosquat Detector 140.

Outbound/Inbound Email 134 may determine whether an email is outgoing or incoming by analyzing header information. Outbound/Inbound Email 134 may maintain a list of domains associated with an enterprise through Enterprise Domain List to determine whether an email address or domain is associated with the enterprise or is external.

Filter Module 138 may remove bulk emails, surveys, quarantine notifications, and other non-relevant messages from further analysis through configurable pattern matching logic. For example, Filter Module 138 may analyze email characteristics including sender patterns, recipient counts, subject line keywords, and message content to identify bulk email campaigns or automated system notifications that do not represent legitimate and/or applicable business correspondence. For example, there may be instances where bulk emails may be legitimate (e.g., business surveys, newsletters, etc.) but not applicable to a BEC attack scenario. Filtered observations may be maintained in a separate state where they are not counted toward the observation history (e.g., Domain Observation Cache 124), preventing false immunization scenarios while preserving the ability to detect typosquats that may attempt to impersonate previously filtered domains in targeted attack scenarios.

Domain Typosquat Detector 140 may include multiple filtering and analysis modules that work together in various combinations to identify potential typosquat domains while reducing false positive alerts. Domain Typosquat Detector 140 may receive newly observed domains from SMTP Record Preprocessor 130 and compare the newly observed domains against previously observed domains stored in Domain Observation Cache 124 to identify potential typosquats that may be used in business email compromise attacks. Additional details are provided in FIG. 2 below.

Webmail Typosquat Detector 150 may include specialized components configured to analyze webmail addresses where domain registration data may not be available for traditional domain-based analysis techniques. Webmail Typosquat Detector 150 may receive webmail addresses identified by Webmail Domain Detector 136 and process the webmail addresses through multiple filtering and analysis modules that account for the different characteristics of webmail services compared to enterprise or organizational domains. Additional details are provided in FIG. 3 below.

Keyword Module 160 may generate alerts for newly observed domains or email addresses containing specific high-risk keywords. Keyword Module 160 may analyze newly seen domains and email addresses for the presence of specific keywords, such as “CPA” or “LAW”, that may be associated with business email compromise attacks targeting particular professional categories or industries. A configurable list of high-risk keywords that may be derived from historical business email compromise attack data may be maintained. Keyword Module 160 may apply pattern matching logic to identify specific keyword patterns within newly observed domains and email addresses, including exact keyword matches and variations that account for common character substitutions or formatting variations. The keyword-based detection may operate independently of similarity scoring algorithms to generate alerts for newly seen domains that may not trigger similarity-based detection but may contain indicators of professional impersonation attempts targeting high-value categories commonly associated with business email compromise attacks, with keyword-based alerts transmitted to the SIEM 170 for analyst review alongside similarity-based detection alerts. In addition, an embodiment of the present invention may suggest potential keywords based on pattern recognition, analytics/insights, observations, external inputs, etc.

Limited Contact Monitor 180 may provide additional scrutiny for specifically tasked enterprise email addresses that communicate with a restricted set of external contacts. Limited Contact Monitor 180 may track specific enterprise email addresses designated for communication with only a limited number of external domains, such as commodities trading groups or settlement organizations, or other specialized business functions that may require controlled external communication patterns and may generate alerts when these addresses communicate with previously unseen external contacts. This may involve parsing each email to check for the presence of these monitored email addresses and updating communication counts with external domains. Additional filters may be applied to exclude auto-replies and blocked emails from being counted as outbound communications. With Limited Contact Monitor 180, alerts may be generated for legitimate communications with designated sensitive email addresses.

Limited Contact Monitor 180 may include an Autoreply Filter 182 that excludes automated responses, a Blocked Email Filter 184 that filters out emails blocked by security controls, an Email Counts Database 186 that maintains communication frequency data between monitored addresses and external contacts, and a New Contact Detector 188 that identifies when monitored addresses communicate with previously unseen external contacts.

Enterprise Email Directory 190 may extract human email addresses rather than automated notification addresses or distribution lists. Enterprise Email Directory 190 may be processed to identify and extract email addresses that correspond to individual human users within the enterprise rather than distribution lists, automated notification systems, etc. Enterprise Email Directory 190 may be used by Limited Contact Monitor 180 to focus monitoring efforts on genuine human-to-human communications while excluding automated or bulk communication systems that may not represent security-relevant communication patterns.

Limited Contact Monitor 180 may utilize Email Proxy Logs 192 and Message Delivery Status Database 194 to determine delivery status for communications involving monitored enterprise addresses. Email Proxy Logs 192 may provide delivery status information that may enable Limited Contact Monitor 180 to distinguish between delivered communications and blocked or filtered messages when tracking external contact patterns. Email Proxy Logs 192 may be used to weed out spammers to significantly reduce alerts.

An embodiment of the present invention may generate alerts for potential typosquats that satisfy similarity thresholds and filtering criteria applied by Domain Typosquat Detector 140, Webmail Typosquat Detector 150, Keyword Module 160, Limited Contact Monitor 180. The alert generation process may occur when newly observed domains or email addresses pass through the filtering and analysis modules and may meet the criteria established for potential typosquat identification.

An embodiment of the present invention may generate multiple alerts for the same email when the email triggers different detection modules within the typosquat detection system. For example, a single email communication may contain domains or email addresses that may satisfy alert criteria for multiple detection pathways simultaneously. Domain Typosquat Detector 140 may generate a first alert for a newly observed domain that may be similar to a previously observed legitimate domain, while Keyword Module 160 may generate a second alert for the same email if the newly observed domain contains high-risk keywords that may indicate professional impersonation attempts.

The multi-alert generation capability may enable comprehensive detection coverage where different aspects of the same email communication may trigger different detection logic pathways. The system may generate alerts from Domain Typosquat Detector 140, Webmail Typosquat Detector 150, Keyword Module 160, and Limited Contact Monitor 180 for the same underlying email communication when the email satisfies the respective detection criteria for multiple detection modules. The multiple alerts generated for the same email may provide analysts with comprehensive information about different potential security concerns identified within a single email communication.

Alerts may be transmitted to SIEM 170 for analyst review, where the SIEM 170 may receive alerts from Domain Typosquat Detector 140, Webmail Typosquat Detector 150, Keyword Module, and/or Limited Contact Monitor 180. SIEM 170 may have API access to facilitate integration with various systems, applications, etc. The alert transmission may include structured data containing similarity scores, filtering criteria results, and/or observation context information from Domain Observation Cache 124 and other storage devices. SIEM 170 may combine alerts based on shared message ID fields when multiple alerts are generated for the same email communication, utilizing message ID information to identify alerts originating from the same underlying email and combining them into unified cases for analyst triage.

An embodiment of the present invention may provide various user interfaces including command line tools for analysts to query various storage devices such as Domain Observation Cache 124 during triage to retrieve historical domain and contact information, enabling analysts to access detailed observation history including when specific domains were first observed, last observed, and the contexts in which the domains have appeared within enterprise email communications. The command line tools may provide access to a graph database to enable analysts to retrieve communication pattern information for webmail addresses under investigation, including which enterprise contacts have communicated with specific webmail addresses and frequency and temporal information about these communications. The analyst query tools may provide structured access to observation data maintained by Summarization Module 122 and stored in Domain Observation Cache 124, graph database, etc., enabling analysts to retrieve comprehensive historical information that may support investigation and triage processes beyond the immediate alert information provided through the SIEM 170.

The system of FIG. 1B may be implemented in a variety of ways. Architecture within system may be implemented as hardware components (e.g., module) within one or more network elements. It should also be appreciated that architecture within system may be implemented in computer executable software (e.g., on a tangible, non-transitory computer-readable medium) located within one or more network elements. Module functionality of architecture within system may be located on a single device or distributed across a plurality of devices including one or more centralized servers and one or more mobile units or end user devices. The architecture depicted in system is meant to be exemplary and non-limiting. For example, while connections and relationships between the elements of system is depicted, it should be appreciated that other connections and relationships are possible. The system described below may be used to implement the various methods herein, by way of example. Various elements of the system may be referenced in explaining the exemplary methods described herein.

Figure 2:
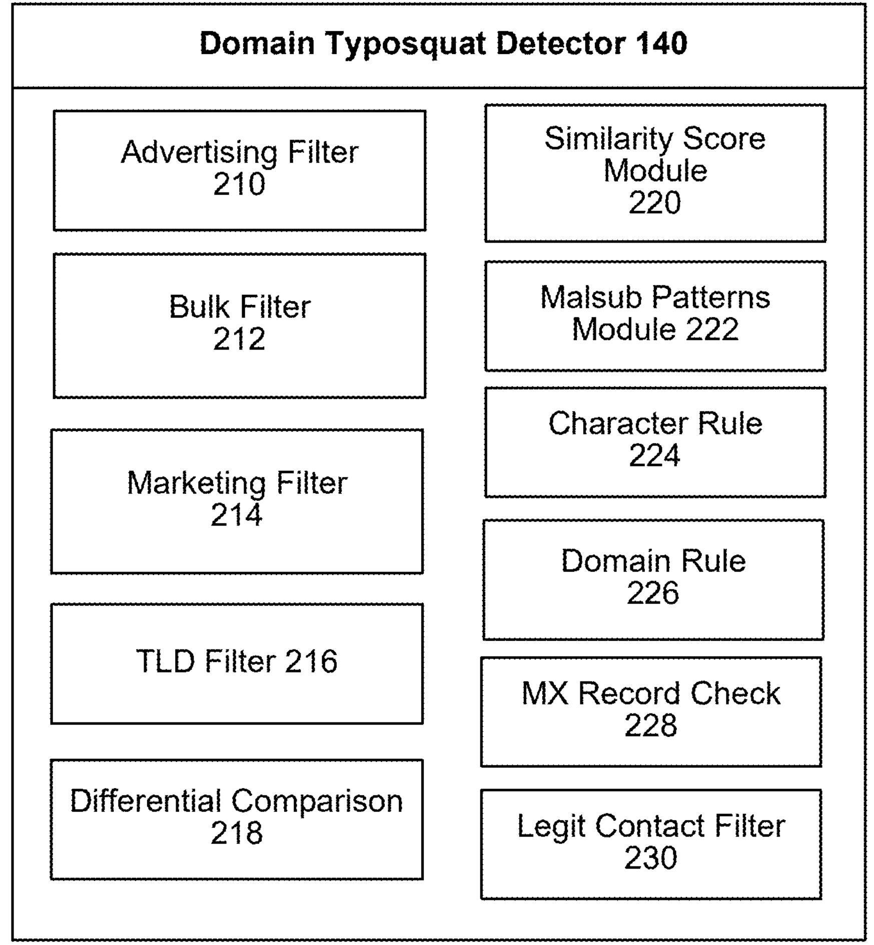
FIG. 2 is an exemplary block diagram of a domain typosquat detector, according to an embodiment of the present invention.

FIG. 2 is detailed illustration of a domain typosquat detector, according to an embodiment of the present invention. As shown in FIG. 2, Domain Typosquat Detector 140 may include various modules, interfaces and processing components including Advertising Filter 210, Bulk Filter 212, Marketing Filter 214, Top Level Domain (TLD) Filter 216, Differential Comparison 218, Similarity Score 220, Malsub Patterns 222, Character Rule 224, Domain Rule 226, Mail Exchange (MX) Record Check 228, and Legit Contact Filter 230. Other functionality and processing may be provided. The processing components are exemplary and illustrative only. For example, Domain Typosquat Detector 140 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Domain Typosquat Detector 140 may apply multiple filtering and analysis modules that work together in various combinations to identify potential typosquat domains while reducing false positive alerts. Domain Typosquat Detector 140 may receive newly observed domains from the SMTP Record Preprocessor 130 and compare the newly observed domains against previously observed domains stored in Domain Observation Cache 124 to identify potential typosquats that may be used in business email compromise attacks.

Advertising Filter 210 that may identify and filter out domains associated with advertising or marketing campaigns based on specific patterns in email fields. Advertising Filter 210 may analyze subject keywords that may be associated with SPAM campaigns and filter out emails containing specific keywords in subject lines that indicate commercial rather than malicious intent.

Bulk Filter 212 that may identify mass email campaigns by analyzing recipient counts and other indicators of bulk email distribution. Bulk Filter 212 may implement recipient count thresholds that may identify bulk mail campaigns sent to large recipient lists. In addition, Bulk Filter 212 may apply pattern matching logic to identify emails that may be classified as bulk communications or automated notifications.

Marketing Filter 214 that may provide additional filtering for marketing-related domains by examining multipart boundary characters that may be used to separate sections within SMTP messages and message ID patterns that may identify distinctive message ID formats used by marketing services and automated email systems. For example, regex matching may be applied on specific fields, e.g., user_agent, multipart_boundary, etc.).

Top Level Domain (TLD) Filter 216 that may examine top-level domain characteristics to identify suspicious patterns in domain structure. TLD Filter 216 may analyze domain extensions and apply filtering logic based on the characteristics of different top-level domains that may be associated with legitimate versus potentially malicious domain registrations. TLD Filter 216 may also filter out TLD patterns commonly associated with false positive alerts in order to reduce alert volume.

Differential Comparison 218 module that may analyze domains appearing on the same email thread to adjust detection thresholds accordingly. Differential Comparison 218 module may lower similarity score thresholds for domains that appear within the same communication context, as the presence of similar domains within the same email thread may indicate potential impersonation attempts.

Similarity Score Module 220 may compute string similarity scores between newly observed domains and established contacts using algorithms, such as edit distance algorithms. Similarity Score Module 220 may apply a similarity algorithm, such as Levenshtein distance, Damerau-Levenshtein distance, or Jaro-Winkler similarity scoring, to calculate a similarity score or metric between domain strings based on matching characters and transpositions with weighting that may give greater importance to matches near the beginning of domain strings.

In some instances, Similarity Score 220 may access Domain Observation Cache 124 to gather a list of domains that have been observed within a configurable period of time, e.g., 90 days. Recent domains that have been observed may be gathered and then compared with the newly observed domain to generate a string similarity score.

Malsub Patterns Module 222 may apply predefined rules to detect known malicious character or word substitution patterns compiled from historical business email compromise attack data. Malsub Patterns Module 222 may identify character-level substitutions such as replacing "m" with "rn", "e" with "3", or "1" with "1" that may create visually similar but technically different domain strings, and may implement word-level substitution patterns that may identify suspicious word replacements such as substituting "since" with "sense" or other linguistically similar terms.

Character Rule 224 may identify suspicious use of punctuation and character positioning in domain names. Character Rule 224 may analyze the placement of hyphens and other punctuation characters within domain names to identify patterns that may be associated with typosquat attempts.

Domain Rule 226 may apply a one old one new domain rule that implements domain age-based filtering that requires one domain in a similar pair to be well-established while the other domain is newly registered before generating a typosquat alert. The one old one new domain rule may utilize registration date information obtained from the external domain enrichment service 120 through the domain enrichment cache 126 and may implement a sliding scale threshold adjustment where newer domains require higher similarity scores while older domains allow lower similarity scores for alert generation. For example, one old one new domain rule may be used to filter out marketers who register multiple similar domains at once or within a predetermined short period of time. To generate an alert, Domain Rule 226 may determine whether a first domain that is similar to a second domain has been registered prior to a predetermined number of days (e.g., 60 days) and the second domain is considered new or registered within the last 30 days, for example. With a sliding scale, the predetermined number of days thresholds may be adjusted to accommodate very recent new domains that may not require exact similarity and older domains which may require closer similarity. Other domain rules and variations in thresholds may be applied.

Mail Exchange (MX) Record Check 228 that may validate whether domains have legitimate mail exchange records by querying DNS records to determine if domains are configured to receive email communications. MX Record Check 228 may filter out non-functional domains that lack proper email infrastructure to reduce false positive alerts from similarity comparisons with domains that may represent accidental typos rather than intentional typosquat domains created for malicious purposes.

Legit Contact Filter 230 that may apply heuristics to determine whether domains represent legitimate contacts of the enterprise based on email delivery history and observation patterns maintained in Domain Observation Cache 124. Legit Contact Filter 230 may utilize delivery status information from Email Proxy Logs 192 and Message Delivery Status Database 194 to evaluate whether domains have been observed in successfully delivered email communications rather than blocked as spam or malicious content.

Figure 3:
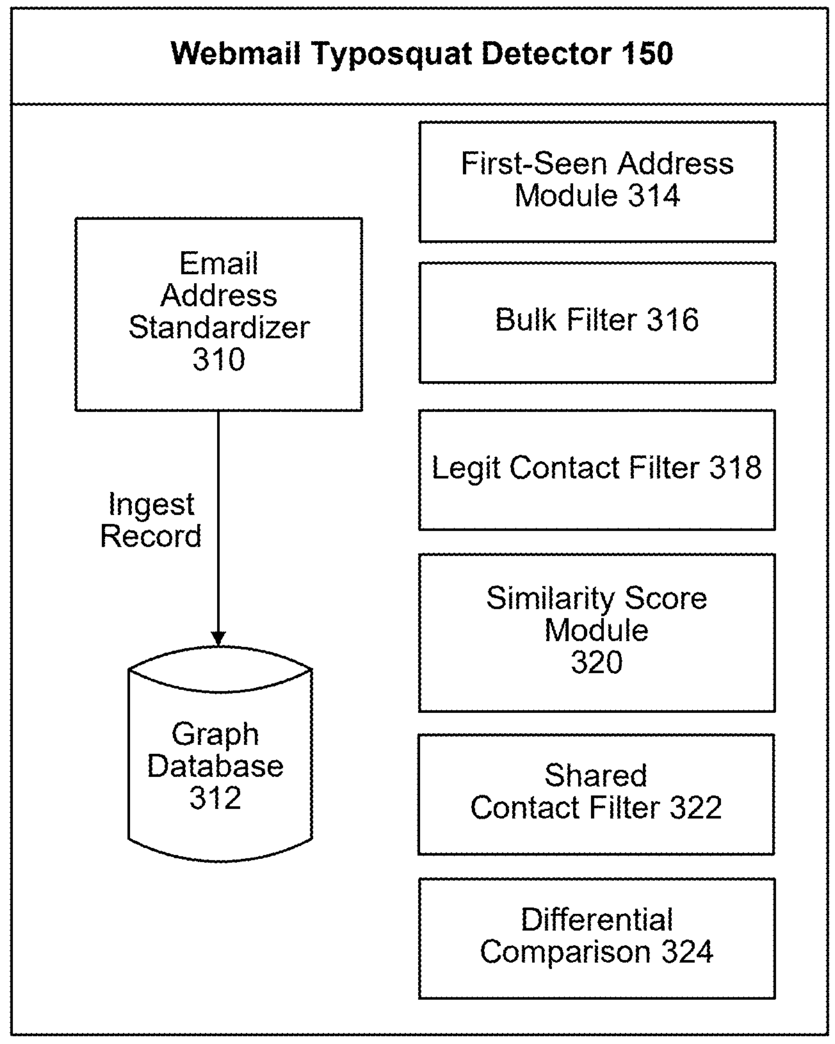
FIG. 3 is an exemplary block diagram of a webmail typosquat detector, according to an embodiment of the present invention.

FIG. 3 is detailed illustration of a webmail typosquat detector, according to an embodiment of the present invention. As shown in FIG. 3, Webmail Typosquat Detector 150 may include various modules, interfaces and processing components including Email Address Standardizer 310, Graph Database 312, First Seem Address Module 314, Bulk Filter 316, Legit Contact Filter 318, Similarity Score Module 320, Shared Contact Filter 322, and Differential Comparison 324. Other functionality and processing may be provided. The processing components are exemplary and illustrative only. For example, Webmail Typosquat Detector 150 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit.

The modules and/or components may be further duplicated, combined and/or separated across multiple systems at local and/or remote locations. Other architectures may be realized.

As shown in FIG. 3, Webmail Typosquat Detector 150 may include specialized components configured to analyze webmail addresses where domain registration data may not be available for traditional domain-based analysis techniques. Webmail Typosquat Detector 150 may process the webmail addresses through multiple filtering and analysis modules that may account for the different characteristics of webmail services compared to enterprise or organizational domains.

Email Address Standardizer 310 may process incoming email addresses to normalize their format for consistent analysis and storage. Email Address Standardizer 310 may convert email addresses to standardized formats that may enable accurate comparison and matching operations across different email address variations that may represent the same underlying webmail account.

Graph Database 312 that may store and manage relationship and observation data for webmail addresses. Graph Database 312 may track communication patterns and relationships between webmail addresses and enterprise contacts, enabling Webmail Typosquat Detector 150 to analyze communication history and relationship patterns that may indicate legitimate versus potentially malicious webmail addresses. For example, Graph Database 312 may capture who the webmail address has communicated with (e.g., within an enterprise), how often the webmail address has been seen, when it was seen first (e.g., observed age of webmail email address), other email addresses on email threads in common with the webmail address, whether the email address has been blocked or delivered through an Email Proxy Log 192.

First-Seen Address Module 314 that may determine whether a webmail address is being observed for the first time within the enterprise email environment. First-Seen Address Module 314 may query Graph Database 312 to determine whether a webmail address has been previously recorded and route newly observed webmail addresses through appropriate analysis pathways.

Bulk Filter 316 that may filter out mass email campaigns based on recipient count and other characteristics specific to webmail communications. Bulk Filter 316 may analyze recipient patterns and message characteristics to identify webmail addresses that may be used for bulk email distribution rather than targeted business communications.

Legit Contact Filter 318 that may evaluate whether webmail addresses correspond to legitimate contacts based on historical delivery and communication patterns stored in Graph Database 312. Legit Contact Filter 318 may utilize delivery status information from Email Proxy Logs 192 and Message Delivery Status Database 194 to determine whether webmail addresses have been associated with successfully delivered email communications rather than blocked or filtered messages. For example, if a new webmail address is similar to another webmail address that is stored in Graph Database 312 but has been determined to be blocked, an alert will not be generated because it is not similar to a legitimate contact of the enterprise.

Similarity Score Module 320 may compute string similarity scores between newly observed webmail addresses and previously observed addresses using algorithms such as Levenshtein distance, Damerau-Levenshtein distance, or Jaro-Winkler similarity scoring. Similarity Score Module 320 may apply string comparison algorithms specifically adapted for email address analysis, with a focus on username portions of email addresses while accounting for webmail provider domains.

Shared Contact Filter 322 may determine whether two similar webmail addresses have communicated with common enterprise contacts. Shared Contact Filter 322 may query Graph Database 312 to identify shared communication relationships between webmail addresses being compared for similarity. For example, if a new webmail address is similar to another webmail address that has been seen before (and has not been blocked) and the webmail addresses have a shared contact at the enterprise, an alert may be generated. In addition, Enterprise Email Directory 190 may be used to determine whether the shared contact is a human user, and potentially whether the shared contact is a member of a particular department within the enterprise (e.g., client services), in order to reduce alert volume.

Differential Comparison 324 that may analyze whether similar webmail addresses appear on the same email thread and may adjust detection thresholds to enable cross-provider comparisons when webmail addresses are observed within the same email communication thread. Differential Comparison 324 may lower similarity score thresholds for webmail addresses that appear on the same email thread, as the presence of similar addresses within the same communication context may indicate potential impersonation attempts, and may enable Webmail Typosquat Detector 150 to generate alerts for similar usernames using different webmail providers when the addresses appear on the same email thread (e.g., johndoe@gmail.com and johndoe@yahoo.com).

Webmail Typosquat Detector 150 may generate alerts when newly observed webmail addresses satisfy similarity thresholds established by Similarity Score Module 320 and may pass through filtering criteria applied by Bulk Filter 316, Legit Contact Filter 318, Shared Contact Filter 322, etc. The alert generation by Webmail Typosquat Detector 150 may account for the specialized requirements of webmail analysis, where alerts may be generated based on communication pattern analysis stored in Graph Database 312.

Figure 4:
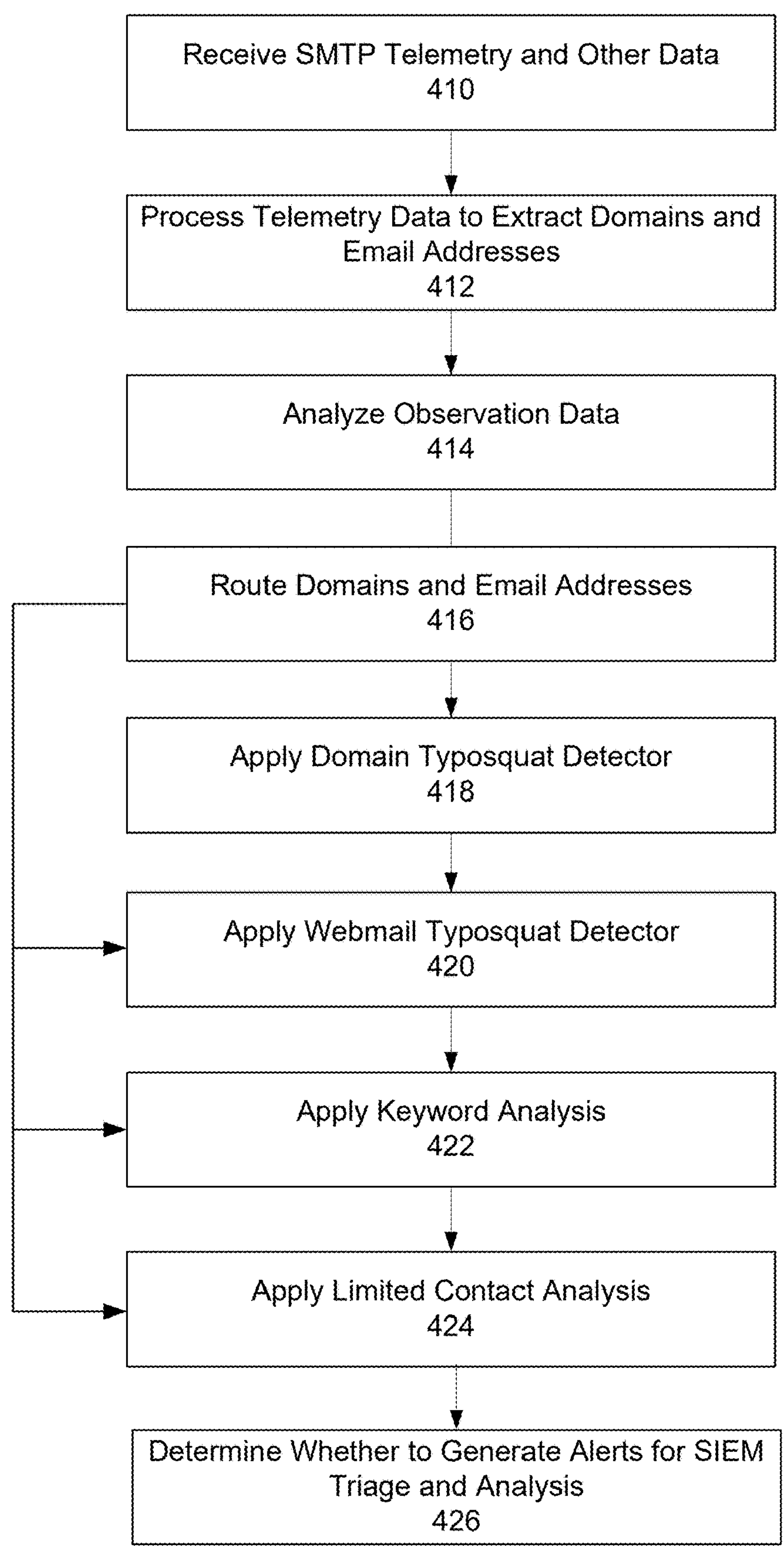
FIG. 4 is an exemplary flowchart, according to an embodiment of the present invention.

FIG. 4 is an exemplary flowchart, according to an embodiment of the present invention. FIG. 4 illustrates a method for detecting typosquat domains and email addresses in enterprise email communications. At step 410, SMTP telemetry data may be received from enterprise email communications. At step 412, SMTP telemetry data may be processed to extract and categorize domain names and email addresses. At step 414, observation data may be analyzed through Summarization Module. At step 416, domain names and email addresses may be routed for typosquat and other detection analysis. At step 418, a domain typosquat detector may be applied to non-webmail domains. At step 420, a webmail typosquat detection may be applied to webmail addresses. At step 422, a keyword analysis may be applied to newly observed domains and email addresses. At step 424, limited contact monitoring may be applied. At step 426, a determination may be made as to whether to generate alerts. The analysis of steps 418, 420, 422, 424 may occur in parallel and/or in various sequences depending on the observations. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step may be provided below.

At step 410, SMTP telemetry data may be received from enterprise email communications. The SMTP telemetry data may include email header information, message content, and metadata from email communications traversing the enterprise email infrastructure.

At step 412, SMTP telemetry data may be processed to extract and categorize domain names and email addresses. Step 412 may involve parsing email records and identifying domain observations from various fields including sender addresses, recipient addresses, and URLs contained within email messages. The categorization may distinguish between domains observed in SMTP header fields, email body content, and URL locations to enable context-specific analysis in subsequent processing steps.

At step 414, observation data may be analyzed through a Summarization Module. The Summarization Module may maintain contextual information about how and where each domain or email address was observed within email communications and may store the observation data in a domain observation cache. The summarization may track temporal observation data including when domains were first seen, last seen, and the number of times each domain has been observed. According to an embodiment of the present invention, the Summarization Module may engage typosquat detectors for first time seen domains.

At step 416, domain names and email addresses may be routed for typosquat and other detection analysis. Newly observed domains may be routed to a domain typosquat detector while newly observed email addresses may be routed to a webmail typosquat detector. Domain names and email addresses may be routed for keyword analysis and a limited contact analysis. The detection analysis may occur in parallel and/or in various sequences and orders.

At step 418, a domain typosquat detector may be applied to non-webmail domains. Domain Typosquat Detector may compare newly observed domains against previously observed domains stored in the domain observation cache using string similarity algorithms including Levenshtein distance, Damerau-Levenshtein distance, and Jaro-Winkler similarity scoring. Domain Typosquat Detector may apply filtering criteria including the one old/one new domain rule, MX record check, and legit contact filter to reduce false positive alerts while maintaining detection accuracy.

At step 420, a webmail typosquat detection may be applied to webmail addresses. Webmail Typosquat Detector may utilize a graph database to track communication patterns and relationships between webmail addresses and enterprise contacts. Webmail Typosquat Detector may apply similarity analysis to compute string similarity scores and filtering to determine whether similar webmail addresses have communicated with common enterprise contacts.

At step 422, a keyword analysis may be applied to newly observed domains and email addresses. The keyword analysis may involve generating alerts for domains or email addresses containing specific high-risk keywords associated with professional categories commonly targeted in business email compromise attacks. The keyword-based detection may operate independently of similarity scoring algorithms to identify potential impersonation attempts that may not closely resemble previously observed domains.

At step 424, limited contact monitoring may be applied to enterprise email addresses that communicate with a restricted set of external contacts. A limited contact monitor may utilize a new contact detector to identify when monitored enterprise addresses communicate with previously unseen external contacts. The limited contact monitor may apply filters such as an autoreply filter and a blocked email filter to exclude automated responses and blocked communications from alert generation.

At step 426, an embodiment of the present invention may determine whether to generate alerts based on whether potential typosquats satisfy similarity thresholds and filtering criteria applied throughout the detection process. Alerts for potential typosquats that pass through the filtering and analysis modules may be generated and then transmitted to a SIEM for analyst review and triage. Multiple alerts may be generated from the same email. An embodiment of the present invention may identify potentially malicious domains and email addresses used in business email compromise attacks while managing alert volume through coordinated application of multiple filtering criteria.

An embodiment of the present invention may be implemented on specialized computing hardware configured to process high-volume email telemetry streams in real-time. An embodiment of the present invention may utilize dedicated processors optimized for string comparison operations and may employ distributed computing architectures to handle enterprise-scale email traffic volumes. For example, the system may implement hardware-accelerated similarity scoring algorithms that may enable rapid comparison of newly observed domains against large databases of previously observed contacts. In addition, storage systems, such as a domain observation cache and a graph database, may be implemented using specialized database systems configured for high-speed read and write operations to support real-time typosquat detection across thousands of concurrent email communications. Further, the system may integrate with enterprise email infrastructure through specialized network interfaces that may capture SMTP telemetry data without introducing latency into email delivery processes.

The system components illustrated in the FIGURES above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the FIGURES above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in the FIGURES may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the FIGURES above illustrate individual devices or components, it should be appreciated that there may be several of such devices to carry out the various exemplary embodiments. Systems may communicate using any mobile or computing device capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built in. Communications with the storage components may be over a network or communications may involve a direct connection between the various storage components, as depicted in the FIGURES above. The storage components may also represent cloud or other network based storage.

Those skilled in the art will appreciate that the diagrams discussed above are merely examples of a system and a method for implementing typosquat detection and analysis and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, .NET, Python, Java, Modula-2, Pascal, Prolog, REXX, Visual Basic, JavaScript and other languages. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system for typosquat detection and analysis, comprising:

an interface configured to receive telemetry data from a plurality of sources;

a database configured to store observation data; and a computer server comprising a computer processor coupled to the interface and the database, wherein the computer processor is further configured to perform the steps of:

receiving, via an interface, SMTP telemetry data from enterprise email communications;

extracting, via a computer processor, domain names and email addresses from the SMTP telemetry data;

accessing, via a summarization module, a domain observation cache that stores previously observed domains and email addresses with corresponding observation context information to determine one or more newly observed domains and email addresses;

routing, via the computer processor, the one or more newly observed domains to a domain typosquat detector subsystem that applies a first set of filters and a first string similarity algorithm to determine whether to generate a domain typosquat alert;

routing, via the computer processor, the one or more newly observed email addresses to a webmail typosquat detector subsystem that applies a second set of filters and a second string similarity algorithm to determine whether to generate a webmail typosquat alert; and transmitting, via a communication link, the domain typosquat alert and the webmail typosquat alert to a security information and event management system for analyst review and triage.

2. The computer-implemented system of claim 1, wherein the first or second string similarity algorithm is configured with algorithm-specific scoring thresholds.

3. The computer-implemented system of claim 1, wherein the computer processor is further configured to perform the step of:

querying, via a domain enrichment module, external domain registration services to obtain registration dates and ownership information for the one or more newly observed domains.

4. The computer-implemented system of claim 1, wherein the first set of filters comprises a one old/one new rule that requires one domain in a similar pair to be registered prior to a predetermined time period and an other domain in the similar pair to be newly registered within a shorter period of time before generating an alert.

5. The computer-implemented system of claim 4, wherein the one old/one new rule applies a sliding scale that adjusts similarity score thresholds based on domain registration age.

6. The computer-implemented system of claim 1, wherein a first set of filters comprises a combination of: an advertising filter that identifies one or more domains associated with a marketing campaign; a bulk filter that identifies a mass email campaign; and a legitimate contact filter that verifies whether a domain has been observed in a delivered email communication.

7. The computer-implemented system of claim 1, wherein the webmail typosquat detector subsystem comprises: a database to track historical communication patterns or relationships between webmail addresses and enterprise contacts.

8. The computer-implemented system of claim 7, wherein the webmail typosquat detector subsystem comprises: a shared contact filter that requires similar webmail addresses to have communicated with common enterprise contacts before generating an alert.

9. The computer-implemented system of claim 1, wherein the computer processor is further configured to perform the step of:

applying, via a keyword module, one or more tasked keywords from a predetermined list in determining whether to generate an alert.

10. The computer-implemented system of claim 1, wherein the computer processor is further configured to perform the step of:

applying, via a limited contact monitor, an additional scrutiny for enterprise email addresses that communicate with a restricted set of external contacts.

11. A computer-implemented method for typosquat detection and analysis comprising the steps of:

receiving, via an interface, SMTP telemetry data from enterprise email communications;

extracting, via a computer processor, domain names and email addresses from the SMTP telemetry data;

accessing, via a summarization module, a domain observation cache that stores previously observed domains and email addresses with corresponding observation context information to determine one or more newly observed domains and email addresses;

routing, via the computer processor, the one or more newly observed domains to a domain typosquat detector subsystem that applies a first set of filters and a first string similarity algorithm to determine whether to generate a domain typosquat alert;

routing, via the computer processor, the one or more newly observed email addresses to a webmail typosquat detector subsystem that applies a second set of filters and a second string similarity algorithm to determine whether to generate a webmail typosquat alert; and transmitting, via a communication link, the domain typosquat alert and the webmail typosquat alert to a security information and event management system for analyst review and triage.

12. The computer-implemented method of claim 11, wherein the first or second string similarity algorithm is configured with algorithm-specific scoring thresholds.

13. The computer-implemented method of claim 11, further comprising the step of:

querying, via a domain enrichment module, external domain registration services to obtain registration dates and ownership information for the one or more newly observed domains.

14. The computer-implemented method of claim 11, wherein the first set of filters comprises a one old/one new rule that requires one domain in a similar pair to be registered prior to a predetermined time period and an other domain in the similar pair to be newly registered within a shorter period of time before generating an alert.

15. The computer-implemented method of claim 14, wherein the one old/one new rule applies a sliding scale that adjusts similarity score thresholds based on domain registration age.

16. The computer-implemented method of claim 11, wherein a first set of filters comprises a combination of: an advertising filter that identifies one or more domains associated with a marketing campaign; a bulk filter that identifies a mass email campaign; and a legitimate contact filter that verifies whether a domain has been observed in a delivered email communication.

17. The computer-implemented method of claim 11, wherein the webmail typosquat detector subsystem comprises: a database to track historical communication patterns or relationships between webmail addresses and enterprise contacts.

18. The computer-implemented method of claim 17, wherein the webmail typosquat detector subsystem comprises: a shared contact filter that requires similar webmail addresses to have communicated with common enterprise contacts before generating an alert.

19. The computer-implemented method of claim 11, further comprising the step of:

applying, via a keyword module, one or more tasked keywords from a predetermined list in determining whether to generate an alert.

20. The computer-implemented method of claim 11, further comprising the step of:

applying, via a limited contact monitor, an additional scrutiny for enterprise email addresses that communicate with a restricted set of external contacts.

* * * * *